United States Patent [19]

Fujita et al.

[11] Patent Number: 5,449,226
[45] Date of Patent: Sep. 12, 1995

[54] BRAKING SYSTEM ACTUATOR

[75] Inventors: Toru Fujita, Chiryu; Hiroyuki Shinkai, Nagoya; Takashi Umeno, Okazaki, all of Japan

[73] Assignee: Nippondenso Co., Ltd., Kariya, Japan

[21] Appl. No.: 112,368

[22] Filed: Aug. 27, 1993

[30] Foreign Application Priority Data

Aug. 28, 1992 [JP] Japan .................................. 4-230225
Jul. 16, 1993 [JP] Japan .................................. 5-176769

[51] Int. Cl.$^6$ .................. B60T 17/02; F04B 39/12; H01R 11/11
[52] U.S. Cl. ..................... 303/116.4; 303/119.2; 417/505; 439/34
[58] Field of Search .............. 251/129.01; 303/10, 303/11, 116.4, 119.2; 417/423.14, 505; 439/34, 638, 926

[56] References Cited

U.S. PATENT DOCUMENTS

| | | | |
|---|---|---|---|
| 4,842,525 | 6/1989 | Galloway et al. | 439/34 |
| 4,898,360 | 2/1990 | VonHayn et al. | 251/129.01 |
| 4,908,593 | 3/1990 | Takayanagi | 335/255 |
| 4,929,038 | 5/1990 | Reinartz et al. | 303/119.2 |
| 5,022,717 | 6/1991 | Heibel et al. | 439/34 X |
| 5,038,125 | 8/1991 | Vogel | 335/202 |
| 5,040,853 | 8/1991 | Burgdorf et al. | 303/119.2 |
| 5,127,440 | 7/1992 | Maas et al. | 137/884 |
| 5,137,455 | 8/1992 | Moerbe et al. | 439/34 |
| 5,152,322 | 10/1992 | Maas et al. | 137/884 |
| 5,275,478 | 1/1994 | Schmitt et al. | 303/119.2 |
| 5,288,141 | 2/1994 | Isshiki et al. | 439/34 X |

FOREIGN PATENT DOCUMENTS

| | | |
|---|---|---|
| 519736 | 12/1992 | European Pat. Off. .......... 303/119.2 |
| 3725385 | 2/1989 | Germany . |
| 3836405 | 5/1990 | Germany . |
| 4018179 | 12/1991 | Germany . |
| 4100967 | 7/1992 | Germany . |
| 61-41655 | 2/1986 | Japan . |
| 63-180550 | 7/1988 | Japan . |
| 2216354 | 8/1990 | Japan . |
| 488781 | 7/1992 | Japan . |
| 8910286 | 11/1989 | WIPO . |
| 9101907 | 2/1991 | WIPO . |

*Primary Examiner*—Robert J. Oberleitner
*Assistant Examiner*—Alfred Muratori
*Attorney, Agent, or Firm*—Cushman, Darby & Cushman

[57] ABSTRACT

A braking system actuator includes a casing which accommodates therein a plurality of electromagnetic valves for controlling operations of a hydraulic circuit. A plurality of terminals which are connected to an external circuit are embedded in a surrounding wall of the casing with a given distance for insulation from each other. Connecting portions of the terminals for the electromagnetic valves extend from the surrounding wall of the casing to reach the neighborhood of corresponding solenoid terminals of the electromagnetic valves for connection therewith. On the other hand, connecting portions of the terminals for a motor which drives a hydraulic pump are connected to positive and negative terminals of the motor, respectively.

10 Claims, 10 Drawing Sheets

BRAKING SYSTEM ACTUATOR

BACKGROUND OF THE INVENTION

1. Field of the Invention

The present invention relates generally to a braking system actuator for a vehicle or aircraft, and more specifically, to an electrical connecting structure for use in such an anti-skid braking system.

2. Description of the Prior Art

In conventional anti-skid braking systems, solenoids of electromagnetic valves are connected to terminals of an external connector via, such as, connecting pins of the solenoids, flexible wires and pin plugs, as disclosed, for example, in Japanese Unexamined Patent Publication No. 63-180550. Further, in conventional systems, connecting terminals of a motor which drives a pump for supplying a pressurized working fluid to a hydraulic circuit are connected to terminals of the outer connector via a flexible wire.

However, in the conventional structure as noted above, a large number of the parts are required for connecting the solenoids of the electromagnetic valves to the terminals of the outer connector, which thus leads to a complicated structure of the system and a cost increment thereof. Further, because the number of electrical coupling portions are large, the reliability of the system is reduced and assembling efficiency inevitably becomes low. Still further, because the connecting terminals of the motor are connected to the terminals of the outer connector via the flexible wire, automization of the assembling process is difficult, thus requiring manual assembly.

SUMMARY OF THE INVENTION

Therefore, it is an object of the present invention to provide an improved a braking system actuator that can eliminate one or more of the above-noted disadvantages inherent in conventional anti-skid braking systems.

To accomplish the above-mentioned and other objects, according to one aspect of the present invention, the braking system actuator comprises a casing made of an insulating material, the casing having at least one connector portion; electromagnetic valves arranged in the casing, the electromagnetic valves each having a solenoid terminal; and terminals connected to an external circuit at the connector portion, the terminals embedded in a surrounding wall of the casing with a given distance from each other, the terminals each having a connecting portion which extends from the surrounding wall of the casing so as to be in the neighborhood of a corresponding one of the solenoid terminals for connection with the corresponding one of the solenoid terminals.

According to another aspect of the present invention, the braking system actuator comprises a casing made of an insulating material, the casing having at least one connector portion and including therein electromagnetic valves; a housing including therein a hydraulic circuit which is opened or closed by the electromagnetic valves; a motor which drives a pump for applying a hydraulic pressure to the hydraulic circuit, the motor having motor terminals at least one of which extends into the casing through the housing with a given distance for insulation from the housing; and terminals connected to an external circuit at the connector portion, the terminals embedded in a surrounding wall of the casing with a given distance from each other, the terminals each having a connecting portion which extends from the surrounding wall of the casing such that at least one of the connecting portions of the terminals is connected to the at least one of the motor terminals in the casing.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to be limitative of the present invention.

In the drawings.

DESCRIPTION OF THE PREFERRED EMBODIMENT

Now, preferred embodiments of the present invention will be described hereinbelow with reference to the accompanying drawings.

FIGS. 1 through 5 show a first preferred embodiment of the present invention, wherein the present invention is applied to an actuator AC of an anti-skid braking system for an automotive vehicle.

Figure 5:
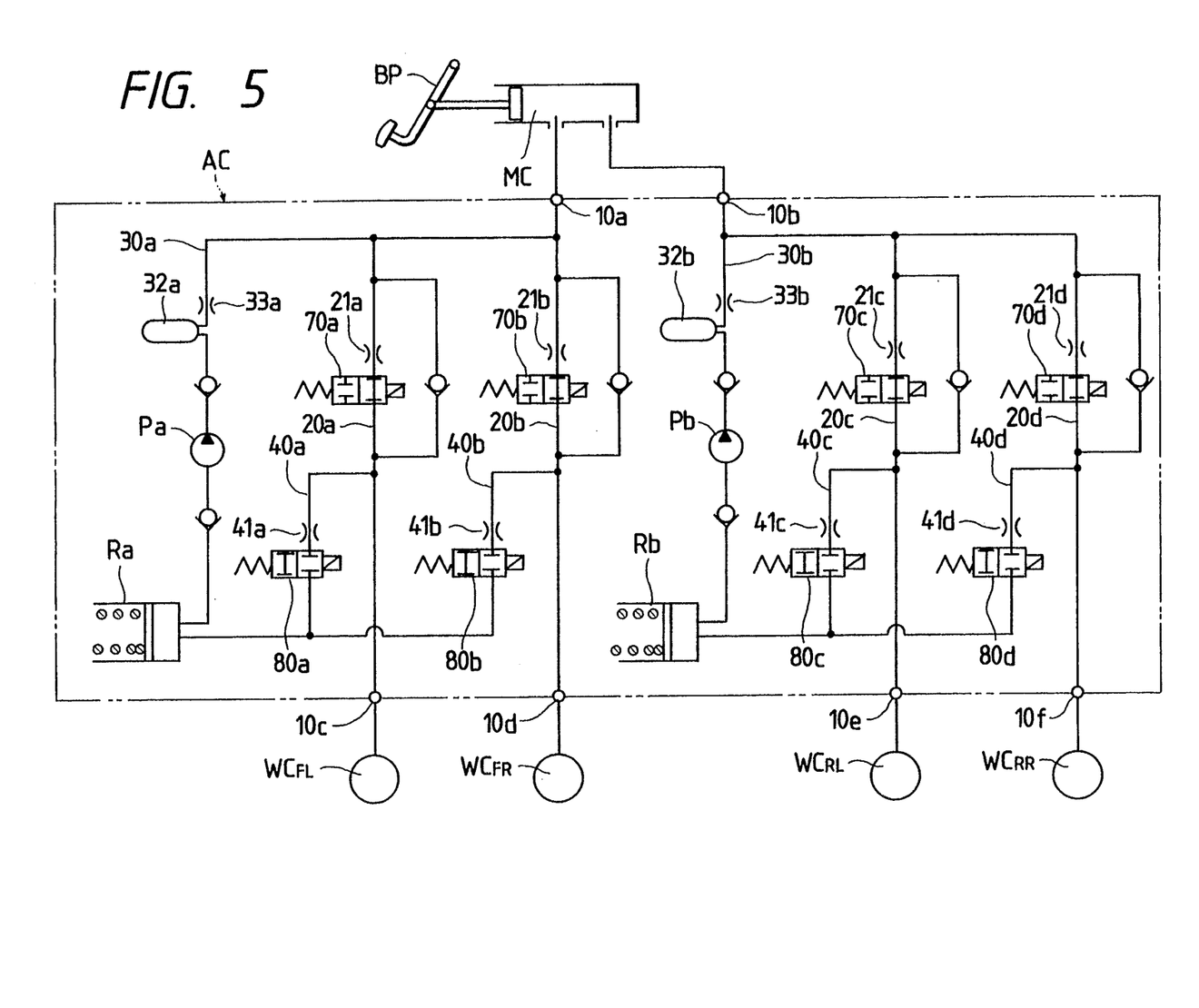
FIG. 5 is a hydraulic circuit diagram schematically showing an anti-skid braking system according to the first preferred embodiment.

In FIG. 5 which shows a hydraulic circuit diagram of the anti-skid braking system, the anti-skid braking system includes the actuator AC interposed between a master cylinder MC actuatable by a brake pedal BP and wheel cylinders $WC_{FL}$, $WC_{FR}$, $WC_{RL}$ and $WC_{RR}$ provided at vehicular front-left, front-right, rear-left and rear-right wheels, respectively.

As shown in FIGS. 1 to 4, the actuator AC includes a housing H and an electromagnetic valve block BL. The housing H forms therein a hydraulic circuit (see FIG. 5) for connecting the master cylinder MC and each of the wheel cylinders $WC_{FL}$, $WC_{FR}$, $WC_{RL}$ and $WC_{RR}$. On the other hand, the valve block BL is mounted to the housing H for controlling operations of the hydraulic circuit in the housing H.

As shown in FIGS. 1, 3 to 5, the housing H has inlet ports 10a, 10b which are respectively in fluid-connection with outlet ports of the master cylinder MC. The housing H further includes outlet ports 10c, 10d, 10e and 10f which are respectively in fluid-connection with inlet ports of the wheel cylinders $WC_{FL}$, $WC_{FR}$, $WC_{RL}$ and $WC_{RR}$. In the housing H, braking fluid pipe lines 20a and 20b, which respectively connect the inlet port 10a to the outlet ports 10c and 10d, and braking fluid pipe lines 20c and 20d which respectively connect the inlet port 10b to the outlet ports 10e and 10f, are provided in parallel columns corresponding to the wheel cylinders $WC_{FL}$, $WC_{FR}$, $WC_{RL}$ and $WC_{RR}$.

Through braking pipe lines 20a, 20b, 20c and 20d, the braking fluid is supplied from the master cylinder MC to the corresponding wheel cylinders $WC_{FL}$, $WC_{FR}$, $WC_{RL}$ and $WC_{RR}$ via corresponding orifices 21a, 21b, 21c and 21d when the brake pedal BP is depressed, and in addition, when corresponding normally-open pressure-intensifying or pressure-increasing electromagnetic valves 70a, 70b, 70c and 70d of the valve block BL are open. The orifices 21a, 21b, 21c and 21d may be provided in the corresponding pressure-increasing valves 70a, 70b, 70c and 70d.

As shown in FIGS. 1, 3 to 5, the housing H further includes therein pressure-increasing pipe lines 30a and 30b. The pressure-increasing pipe line 30a corresponds to a pair of the braking pipe lines 20a and 20b, while the pressure-increasing pipe line 30b corresponds to a pair of the braking pipe lines 20c and 20d. Further, pressure-reducing pipe lines 40a, 40b, 40c and 40d are arranged corresponding to the braking pipe lines 20a, 20b, 20c and 20d, respectively.

Accordingly, when a motor M is operated to drive a piston pump Pa, a pressurized braking fluid is applied from a reservoir Ra to the braking pipe lines 20a and 20b via a damper 32a and an orifice 33a, flowing through the pressure-increasing pipe line 30a. On the other hand, when the motor M, which is the same motor as that associate the piston pump Pa, is operated to drive a piston pump Pb, a pressurized braking fluid is applied from a reservoir Rb to the braking pipe lines 20c and 20e via a damper 32b and an orifice 33b, flowing through the pressure-increasing pipe line 30b. This means that hydraulic braking pressures applied to the corresponding wheel cylinders $WC_{FL}$, $WC_{FR}$, $WC_{RL}$ and $WC_{RR}$ via the corresponding braking pipe lines 20a to 20d are increased during the corresponding pressure-increasing valves 70a to 70d being open.

On the other hand, through the pressure-reducing pipe lines 40a and 40b, hydraulic pressures applied to the wheel cylinders $WC_{FL}$ and $WC_{FR}$ are released to the reservoir Ra when corresponding normally-closed pressure-reducing electromagnetic valves 80a and 80b of the valve block BL are open. Similarly, through the pressure-reducing pipe lines 40c and 40d, hydraulic pressures applied to the wheel cylinders $WC_{RL}$ and $WC_{RR}$ are released to the reservoir Rb when corresponding normally-closed pressure-reducing electromagnetic valves 80c and 80d of the valve block BL are open. This means that the hydraulic braking pressures applied to the wheel cylinders $WC_{FL}$, $WC_{FR}$, $WC_{RL}$ and $WC_{RR}$ are reduced when the corresponding pressure-reducing valves 80a to 80d are open. In this preferred embodiment, as shown in FIGS. 1, 3 to 5, orifices 41a, 41b, 41c and 41d are respectively arranged in the corresponding pressure-reducing pipe lines 40a, 40d, 40c and 40d upstream of the pressure-reducing valves 80a, 80b, 80c and 80d for adjusting corresponding pressure-reducing gradients.

Figure 1:
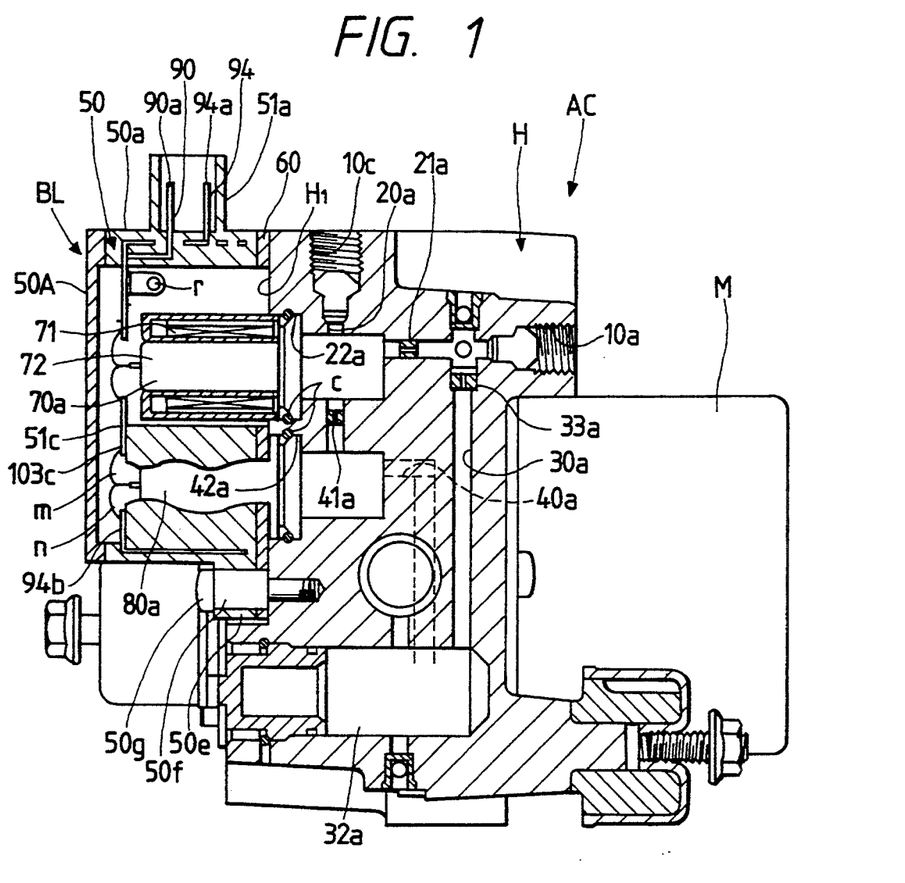
FIG. 1 is a partial sectional view showing an actuator of an a braking system actuator according to a first preferred embodiment of the present invention.
Figure 2:
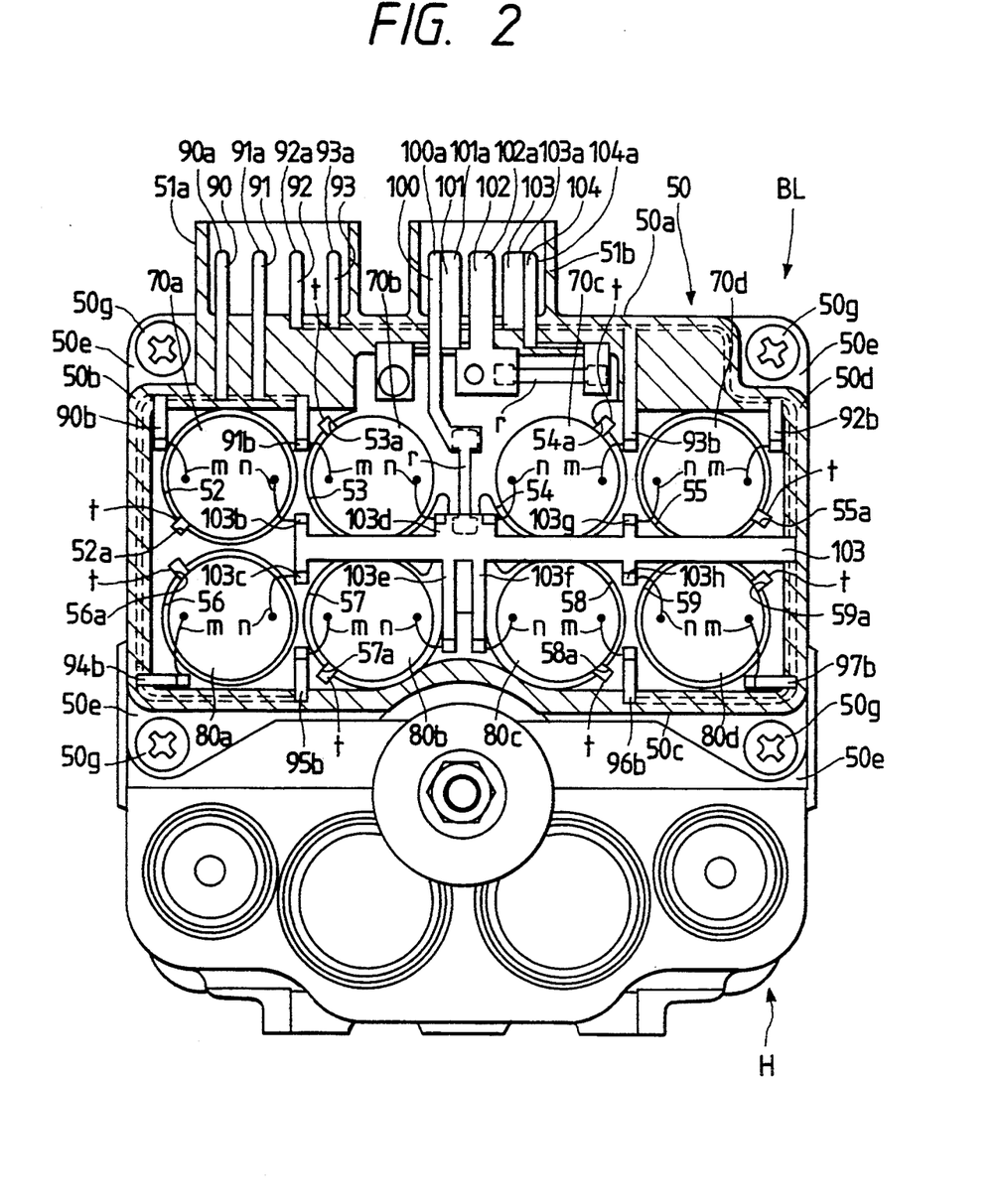
FIG. 2 is an enlarged view of the actuator as seen from an open side of a casing, with a cap or a cover is removed.

As shown in FIGS. 1 and 2, the valve block BL includes a casing 50 which is made of an electrical insulating synthetic resin material and is integrally formed into a shape of a substantially rectangular parallelepiped. On a front wall 50a of the casing 50 are provided a pair of protruding connectors 51a and 51b each having a substantially rectangular parallelepiped shape with a substantially rectangular parallelepiped cavity therein. The casing 50 is fixed at its bottom side to a confronting end surface H1 of the housing H with an annular-like packing 60 interposed therebetween. Specifically, the casing 50 has rib portions 50e at its bottom side, and a collar 50f for a screw 50g is fixedly fitted into each rib portions 50e and a corresponding portion of the packing 60. Each screw 50g is screwed into the confronting end surface H1 of the housing H through the collar 50f so as to firmly fix the casing 50 to the housing H with the packing 60 interposed therebetween.

The valve block BL is equipped with the foregoing pressure-increasing valves 70a to 70d and the foregoing pressure-reducing valves 80a to 80d. As understood from FIGS. 1 to 4, the pressure-increasing valves 70a to 70d are respectively received in corresponding accommodating bores 52 to 55 formed side by side in line in the casing 50 at positions corresponding to the braking pipe lines 20a to 20d, and are respectively mounted to the housing H at its end surface H1 so as to be exposed to the corresponding braking pipe lines 20a to 20d. On the other hand, the pressure-reducing valves 80a to 80d are respectively received in corresponding accommodating bores 56 to 59 formed side by side in line in the casing 50 at positions corresponding to the pressure-reducing pipe lines 40a to 40d and under the accommodating bores 52 to 55 in FIG. 2, and are respectively mounted to the housing H at its end surface H1 so as to be exposed to the corresponding pressure-reducing pipe lines 40a to 40d.

Specifically, the pressure-increasing valve 70a is constituted by a solenoid unit 71 and a core unit 72. A base portion of the core unit 72 is concentrically fitted into a mounting bore 22a formed in the housing H. The mounting bore 22a is formed on the end surface H1 and extends into the housing H toward the braking pipe line 20a concentrically with the accommodating bore 52 formed in the casing 50. The core unit 72 is arranged in the solenoid unit 71 coaxially therewith, and blocks an inside path by means of its rod-shaped valve member when the solenoid unit 71 is energized. In other words, the pressure-increasing valve 70a is closed to disable communication between upstream and downstream sides of the braking pipe line 20a when the solenoid unit 71 is energized.

The pressure-increasing valves 70b, 70c and 70d are the same in structure as that of the pressure-increasing valve 70a. The pressure-increasing valve 70b is closed to disable communication between upstream and downstream sides of the braking pipe line 20b when its solenoid unit is energized. The pressure-increasing valve 70c is closed to disable communication between upstream and downstream sides of the braking pipe line 20c when its solenoid unit is energized. The pressure-increasing valve 70d is closed to disable communication between upstream and downstream sides of the braking pipe line 20d when its solenoid unit is energized. The pressure-increasing valves 70b, 70c and 70d are respectively received in corresponding mounting bores 22b, 22c and 22d concentrically therewith. As seen from FIG. 3, the mounting bores 22a, 22b, 22c and 22d are arranged in the housing H side by side in line, and as the mounting bore 22a, the mounting bores 22b, 22c and 22d are arranged concentrically with the corresponding accommodating bores 53, 54 and 55 formed in casing 50.

Further, as shown in FIG. 2, on outer circumferences of the pressure-increasing valves 70a to 70d, i.e. pn outer circumferences of their solenoid units, projections t~t are provided. The projections t~t are respectively fitted into corresponding recesses 52a, 53a, 54a and 55a formed on inner walls of the accommodating bores 52, 53, 54 and 55 of the casing 50, so as to prevent rotation of the solenoid unit 71 of the pressure-increasing valve 70a as well as the respective solenoid units of the pressure-increasing valves 70b, 70c and 70d.

The pressure-reducing valve 80a is, similar to the pressure-increasing valve 70a, constituted by a solenoid unit and a core unit. A base portion of the core unit of the pressure-reducing valve 80a is concentrically fitted into a mounting bore 42a formed in the housing H. The mounting bore 42a is formed on the end surface H1 and extends into the housing H toward the pressure-reducing pipe line 40a concentrically with the accommodating bore 56 formed in the casing 50. The core unit of the pressure-reducing valve 80a is arranged in the solenoid unit coaxially therewith, and opens a path in the solenoid unit by means of its rod-shaped valve member when the solenoid unit is energized. In other words, the pressure-reducing valve 80a is opened to establish communication between upstream and downstream sides of the pressure-reducing pipe line 40a when the solenoid unit is energized.

The pressure-reducing valves 80b, 80c and 80d are the same in structure as that of the pressure-reducing valve 80a. The pressure-reducing valve 80b is opened to establish communication between upstream and downstream sides of the pressure-reducing pipe line 40b when its solenoid unit is energized. The pressure-reducing valve 80c is opened to establish communication between upstream and downstream sides of the pressure-reducing pipe line 40c when its solenoid unit is energized. The pressure-reducing valve 80d is opened to establish communication between upstream and downstream sides of the pressure-reducing pipe line 40d when its solenoid unit is energized. The pressure-reducing valves 80b, 80c and 80d are respectively received in corresponding mounting bores 42b, 42c and 42d concentrically therewith. As seen from FIG. 3, the mounting bores 42a, 42b, 42c and 42d are arranged in the housing H side by side in line, and as the mounting bore 42a, the mounting bores 42b, 42c and 42d are arranged concentrically with the corresponding accommodating bores 57, 58 and 59 formed in the casing 50.

Further, as shown in FIG. 2, on outer circumferences of the pressure-reducing valves 80a to 80d, i.e. on outer circumferences of their solenoid units, projections t~t are provided. The projections t~t are respectively fitted into corresponding recesses 56a, 57a, 58a and 59a formed on inner walls of the accommodating bores 56, 57, 58 and 59 of the casing 50, so as to prevent rotation of the solenoid units of the pressure-reducing valves 80a to 80d.

As shown in FIG. 1, the casing 50 is covered by a cap or a cover 50A at its open side remote from the housing H. The cover 50A is integrally formed of an electrically insulating synthetic resin material. An inner wall of the cover 50A confronts upper ends of the pressure-increasing valves 70a to 70d and the pressure-reducing valves 80a to 80d, and an open side end surface 51c of the casing 50.

Now, an electrical connecting structure in the valve block BL will be described hereinbelow with reference to FIGS. 1 and 2.

As seen from FIG. 2, eight connector terminals 90 to 97 (FIG. 2 only shows the connector terminals 90 to 93) and five connector terminals 100 to 104 are embedded in a surrounding wall, i.e. the front wall 50a and left-side, rear, and right-side walls 50b, 50c and 50d of the casing 50 with sufficient distances for insulation from each other. These connector terminals are insert-molded at the time of molding the casing 50. The connector terminals 90 to 97 respectively protrude into the connector 51a at their fetching end portions 90a to 97a (FIG. 2 only shows the fetching end portions 90a to 93a). Similarly, the connector terminals 100 to 104 respectively protrude into the connector 51b at their fetching end portions 100a to 104a. As understood from FIG. 1, the fetching end portions 94a, 95a, 96a and 97a are arranged in confronting relation to the fetching end portions 90a, 91a, 92a and 93a, respectively.

In FIG. 2, the connector terminal 90 first bends from an inner end of the fetching end portion 90a toward the bottom side of the casing 50 in the front wall 50a at its left side in the figure, then leftward, and then toward the open side (toward the cover 50A) of the casing 50, forming L-shapes in sequence, to finally reach a connecting end portion 90b. The connecting end portion 90b extends from a left end of the front wall 50a in parallel with the left-side wall 50b and along the open side end surface 51c of the casing 50 to reach the vicinity or neighborhood of the upper end of the pressure-increasing valve 70a. The connecting end 90b is welded to a negative solenoid terminal m which extends from the upper end of the solenoid unit 71 of the pressure-increasing valve 70a. The negative solenoid terminal m is formed by a coil with a proper sag. The connector terminal 91 first bends from an inner end of the fetching end portion 91a toward the bottom side of the casing 50 in the front wall 50a at its left side in FIG. 2, then rightward, and then toward the open side of the casing 50, forming L-shapes in sequence, to finally reach a connecting end portion 91b. The connecting end portion 91b extends from the front wall 50a in parallel with the left-side wall 50b and along the open side end surface 51c to reach the neighborhood between the upper ends of the pressure-increasing valves 70a and 70b. The connecting end portion 91b is welded to a negative solenoid terminal m which extends from the upper end of the solenoid unit of the pressure-increasing valve 70b and is formed by a coil with a proper sag.

The connector terminal 94 first bends from an inner end of the fetching end portion 94a toward the bottom side of the casing 50 in the front wall 50a at its left side in FIG. 2, then leftward running below the connector terminal 90 (closer to the bottom side of the casing 50) and in parallel therewith, then rearward (toward the rear wall 50c) in the left-side wall 50b, and then toward the open side of the casing 50, forming L-shapes in sequence, to finally reach a connecting end portion 94b. The connecting end 94b extends from a rear end portion of the left-side wall 50b in parallel with the rear wall 50c and along the open side end surface 51c of the casing 50 to reach the neighborhood of the upper end of the pressure-reducing valve 80a. The connecting end portion 94b is welded to a negative solenoid terminal m which extends from the upper end of the solenoid unit of the pressure-reducing valve 80a and is formed by a coil with a proper sag. The connector terminal 95 first bends from an inner end of the fetching end portion 95a toward the bottom side of the casing 50 in the front wall 50a at its left side in FIG. 2, then leftward, then rearward in the left-side wall 50b running below the connector terminal 94 and in parallel therewith to reach the rear wall 50c, and then toward the open side of the casing 50 in the rear wall 50c at its left side, forming L-shapes in sequence, to finally reach a connecting end portion 95b. The connecting end portion 95b extends from the rear wall 50c in parallel with the left-side wall 50b and along the open side end surface 51c to reach the neighborhood between the upper ends of the pressure-reducing valves 80a and 80b. The connecting end portion 95b is welded to a negative solenoid terminal m which extends from the upper end of the solenoid unit of the pressure-reducing valve 80b and is formed by a coil with a proper sag.

The connector terminal 93 first bends from an inner end of the fetching end portion 93a toward the bottom side of the casing 50 in the front wall 50a at its left side in FIG. 2, then rightward, and then toward the open side of the casing 50 at the right side of the front wall 50a, forming L-shapes in sequence, to finally reach a connecting end portion 93b. The connecting end portion 93b extends from the front wall 50a in parallel with the right-side wall 50d and along the open side end surface 51c of the casing 50 to reach the neighborhood between the upper ends of the pressure-increasing valves 70c and 70d. The connecting end portion 93b is welded to a negative solenoid terminal m which extends from the upper end of the solenoid unit of the pressure-increasing valve 70c and is formed by a coil with a proper sag. The connector terminal 92 first bends from an inner end of the fetching end portion 92a toward the bottom side of the casing 50 in the front wall 50a at its left side in FIG. 2, then rightward running below the terminal 93 and in parallel therewith, and then toward the open side of the casing 50 at the right side of the front wall 50a, forming L-shapes in sequence, to finally reach a connecting end portion 92b. The connecting end portion 92b extends from a right end of the front wall 50a in parallel with the right-side wall 50d and along the open side end surface 51c to reach the neighborhood of the upper end of the pressure-increasing valve 70d. The connecting end portion 92b is welded to a negative solenoid terminal m which extends from the upper end of the solenoid unit of the pressure-increasing valve 70d and is formed by a coil with a proper sag.

The connector terminal 97 first bends from an inner end of the fetching end portion 97a toward the bottom side of the casing 50 in the front wall 50a at its left side in FIG. 2, then rightward running below the connector terminal 92 and in parallel therewith so as to extend into the right-side wall 50d, then rearward in the right-side wall 50d, and then toward the open side of the casing 50 in the right-side wall at its rear end portion (close to the rear wall 50c) forming L-shapes in sequence, to finally reach a connecting end portion 97b. The connecting end portion 97b extends from a rear end portion of the right-side wall 50d in parallel with the rear wall 50c and along the open side end surface 51c of the casing 50 to reach the neighborhood of the upper end of the pressure-reducing valve 80d. The connecting end portion 97b is welded to a negative solenoid terminal m which extends form the upper end of the solenoid unit of the pressure-reducing valve 80d and is formed by a coil with a proper sag. The connector terminal 96 first bends from an inner ends of the fetching end portion 96a toward the bottom side of the casing 50 in the front wall 50a at its left side in FIG. 2, then rightward running below the connector terminal 97 and in parallel therewith so as to extend into the right-side wall 50d, then rearward in the right-side wall 50d to reach the rear wall 50c, and then toward the open side of the casing 50 in the rear wall 50c at its right side, forming L-shapes in sequence, to finally reach a connecting end portion 96b. The connecting end portion 96b extends from the rear wall 50c in parallel with the right-side wall 50d and along the open side end surface 51c to reach the neighborhood between the upper ends of the pressure-reducing valves 80c and 80d. The connecting end portion 96b is welded to a negative solenoid terminal m which extends from the upper end of the solenoid unit of the pressure-reducing valve 80c and is formed by a coil with a proper sag.

The connector terminal 103 first bends from an inner end of the fetching end portion 103a toward the bottom side of the casing 50 in the front wall 50a at its left side in FIG. 2, then rightward running between the connector terminals 92 and 96 and in parallel therewith so as to extend into the right-side wall 50d, then rearward in the right-side wall 50d so as to reach a middle portion thereof, then toward the open side of the casing 50 in the right-side wall 50d, and then toward the left-side wall 50b along the open side end surface 51c of the casing 50, forming L-shapes in sequence, to finally reach the neighborhood among the pressure-increasing valves 70a and 70b and the pressure-reducing valves 80a and 80b. The connector terminal 103 has connecting end portions 103b and 103c which extend in opposite directions from each other. The connecting end portion 103b extends to the neighborhood between the upper ends of the pressure-increasing valves 70a and 70b, and is welded to a positive solenoid terminal n which extends from the upper end of the solenoid unit 71 of the pressure-increasing valve 70a. The positive solenoid terminal n is formed by a coil with a proper sag. The connecting end portion 103c extends to the neighborhood between the upper ends of the pressure-reducing valves 80a and 80b, and is welded to a positive solenoid terminal n which extends from the upper end of the solenoid unit of the pressure-reducing valve 80a and is formed by a coil with a proper sag.

The connector terminal 103 further includes a connecting end portion 103d which extends to the neighborhood between the upper ends of the pressure-increasing valves 70b and 70c. The connecting end portion 103d is welded to positive solenoid terminals n, n which respectively extend from the upper ends of the solenoid units of the pressure-increasing valves 70b and 70c, each formed by a coil with a proper sag. The connector terminal 103 further includes connecting end portions 103e and 103f which respectively extend in an opposite direction relative to the connecting end portion 103d. The connecting end portions 103e and 103f are respectively welded to positive solenoid terminals n, n which respectively extend from the upper ends of the solenoid units of the pressure-reducing valves 80b and 80c, each formed by a coil with a proper sag. The connector terminal 103 further includes connecting end portions 103g and 103h which extend in opposite directions from each other. The connecting end portion 103g extends to the neighborhood between the upper ends of the pressure-increasing valves 70c and 70d, and is welded to a positive solenoid terminal n which extends from the upper end of the solenoid unit of the pressure-increasing valve 70d and is formed by a coil with a proper sag. The connecting end portion 103h extends to the neighborhood between the upper ends of the pressure-reducing valves 80c and 80d, and is welded to a positive solenoid terminal n which extends from the upper end of the solenoid unit of the pressure-reducing valve 80d and is formed by a coil with a proper sag.

The connector terminal 100 works as a terminal for checking a voltage applied to each solenoid unit. The connector terminal 101 works as a negative terminal of the motor M which drives the piston pumps Pa and Pb. A downward force applied to each of the connecting end portions of the connector terminals 90 to 97 and 103 when welding to the corresponding positive or negative solenoid terminal, is supported or born by the open side end surface 51c of the casing 50.

Figure 4:
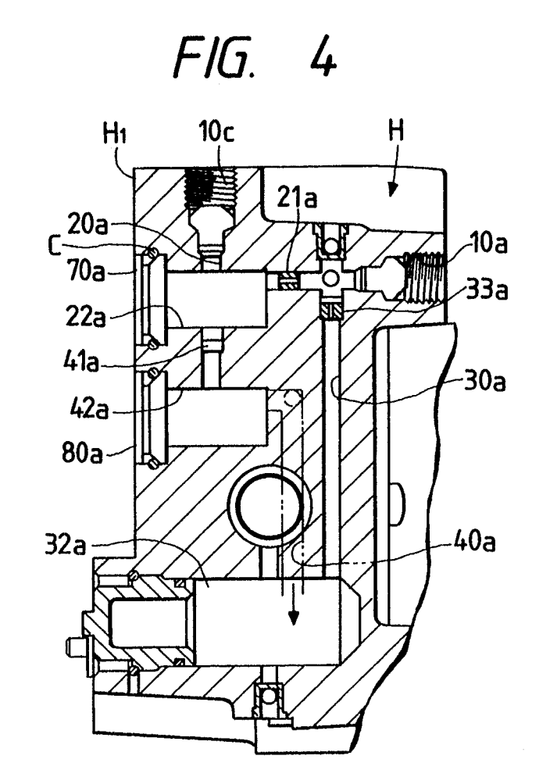
FIG. 4 is a sectional view taken along line 4—4 in FIG. 3.

In FIGS. 1 and 2, a reference r represents a resistor. Each resistor has terminals connectable with the connecting end portions of the connector terminals, and is welded between the corresponding connecting end portions of the connector terminals, for example, a resistor r welded between the connecting end portion of the connector terminal 100 and the connecting end portion 103d of the connector terminal 103. In FIGS. 1 and 4, a reference C represents a C-ring.

In the foregoing first preferred embodiment, in order to connect the connector terminals 90 to 97 and 103 to the corresponding pressure-increasing and pressure-reducing electromagnetic valves 70a to 70d and 80a to 80d, the connecting end portion of each connector terminal is arranged to extend to the neighborhood of the positive or negative solenoid terminal of the corresponding electromagnetic valve from the surrounding wall of the casing 50 and along the open side end surface 51c, so as to be directly welded to the corresponding positive or negative solenoid terminal. Accordingly, the welding is required only at one portion per solenoid terminal for connection to the corresponding connector terminal. As a result, connecting parts between each connector terminal and the corresponding electromagnetic valve can be reduced in number so that the welding process can be significantly simplified, leading to, such as, cost reduction.

Further, since the welding between the connecting end portions of the connector terminals and the corresponding solenoid terminals is performed at the side of the upper ends of the electromagnetic valves, i.e. at the open side of the casing 50, such welding can be performed simultaneously by means of welding electrodes so that the automization thereof can be easily realized. Still further, since the connecting end portion of each connector terminal is arranged to extend along the open side end surface 51c, the downward force applied to the connecting end portion of each connector terminal during such a welding is securely received or born by the open side end surface 51c. Accordingly, the welding is easily performed while maintaining the initial shape of the connecting end portion of each connector terminal. The cover 50A may be mounted to the opening of the casing 50, such as, by welding after completion of the welding.

Further, in the first preferred embodiment, the electromagnetic valves 70a to 70d and 80a to 80d are respectively prevented from rotation by means of the engagement between the projections t of the electromagnetic valves 70a to 70d and 80a to 80d and the corresponding recesses 52a to 55a and 56a to 59a of the accommodating bores 52 to 55 and 56 to 59. Accordingly, even when mechanical vibration is applied to the respective electromagnetic valves, the solenoid units thereof are effectively prevented from being applied with excessive forces, and thus, disconnection at the welded portions between the electromagnetic valves and the connector terminals is effectively prevented.

Further, since the connector terminals 90 to 97 and 100 to 104 are inserted into the surrounding wall of the casing 50 by insert-molding those connector terminals integral with the casing 50, the connector terminals 90 to 97 and 100 to 104 are prevented from protruding inside and outside the casing 50 beyond necessity. Further, since the casing itself works to ensure insulation between the connector terminals, insulating elements and distances for insulation can be set minimum. Still further, since the casing 50 is formed integral with or in unity with the connectors 51a and 51b, sealing members therebetween are not required as opposed to the case where the casing and the connectors are formed separately, and further, this integral structure can easily bear an applied force generated when the connectors 51a and 51b are connected to, i.e. fitted to an external circuit.

Figure 3:
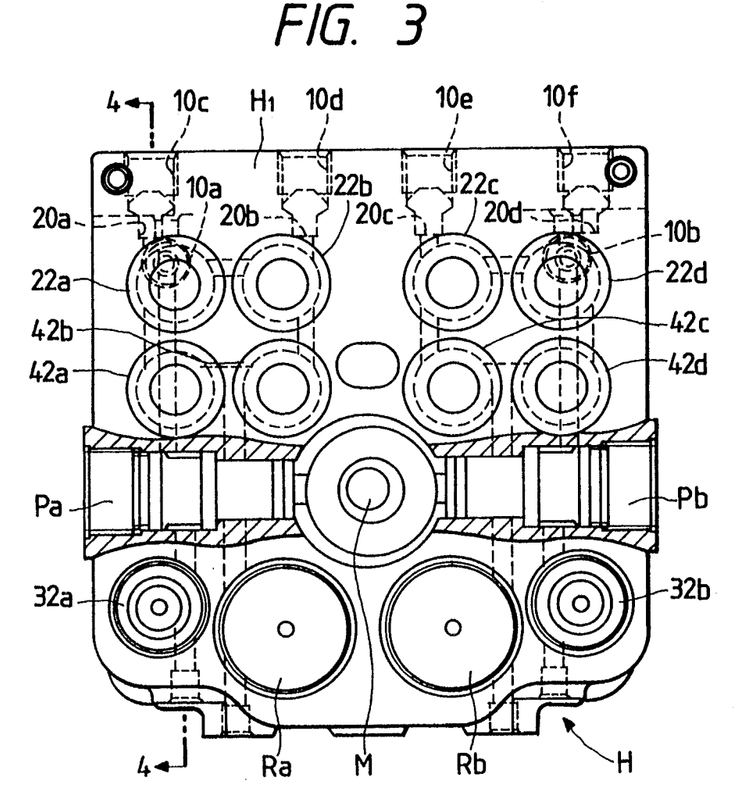
FIG. 3 is a partial sectional view with an electromagnetic valve block being removed in FIG. 2.

Further, as shown in FIGS. 2 to 4, the pressure-increasing valves 70a to 70d of the valve block BL are arranged side by side in line corresponding to the braking pipe lines 20a to 20d of the hydraulic circuit in the housing H, and the pressure-reducing valves 80a to 80d of the valve block BL are arranged side by side in line corresponding to the pressure-reducing pipe lines 40a to 40d of the hydraulic circuit in the housing H and in parallel with the line of the pressure-increasing valves 70a to 70d. Accordingly, the structure of the hydraulic circuit can be simplified, and further, a degree of freedom for arranging the inlet and outlet ports of the housing H can be enhanced. As a result, application of the anti-skid braking system to the automotive vehicle is largely facilitated.

Further, as shown in FIGS. 1, 4 and 5, the orifices 41a to 41d are respectively arranged in the pressure-reducing pipe lines 40a to 40d upstream of the pressure-reducing valves 80a to 80b, i.e. between the corresponding pressure-increasing valves 70a to 70d and pressure-reducing valves 80a to 80d. These orifices improve air bleed in the hydraulic circuit in the housing H, particularly from the braking pipe lines 20a to 20d to the corresponding pressure-reducing pipe lines 40a to 40d.

Figure 6:
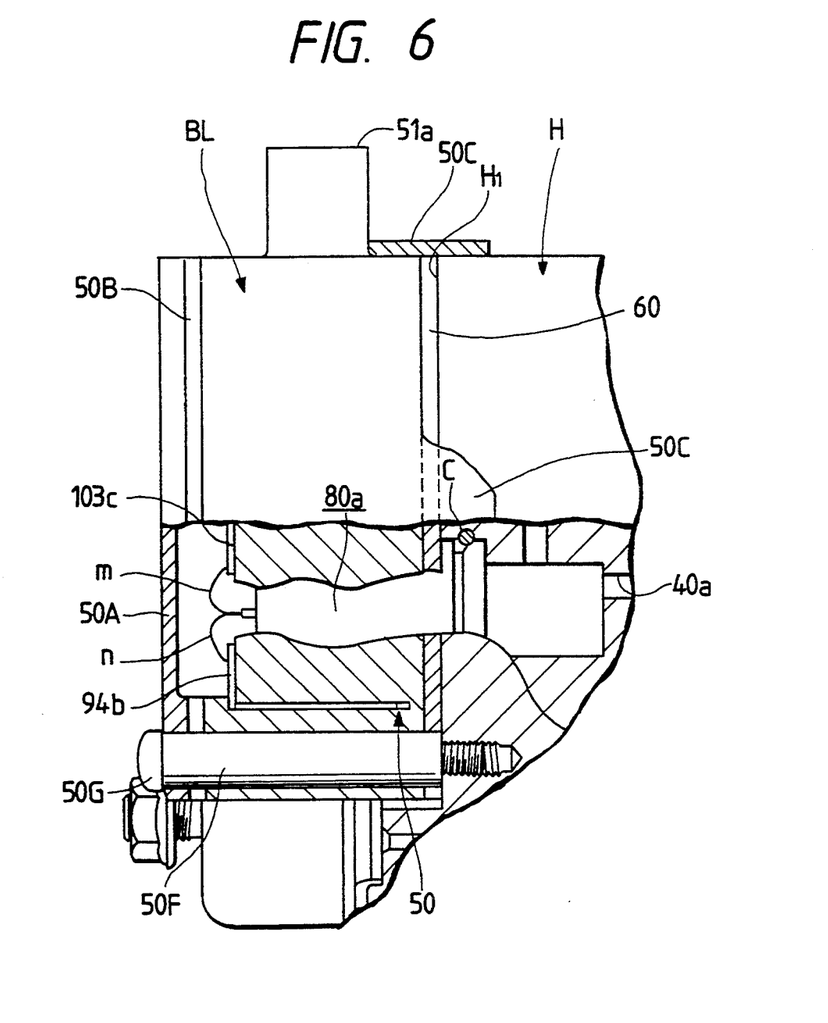
FIG. 6 is a partial sectional view showing a first modification of the first preferred embodiment.

Now, a first modification of the first preferred embodiment will be described with reference to FIG. 6.

In the first modification, fitting members 50C are provided integral with the casing 50. The fitting members 50C are fitted onto the outer periphery of the housing H. Specifically, the fitting members 50C are fitted onto a coupling portion between the housing H and the casing 50 via the packing 60 from outside so as to strengthen a coupling condition between the housing H and the casing 50 via the packing 60. Further, the cover 50A is mounted to the opening of the casing 50 via an annular-like packing 50B by means of the screws 50G with the collars 50F which are screwed into the housing H, as shown in FIG. 6. The other structure is the same as that of the first preferred embodiment.

Figure 8:
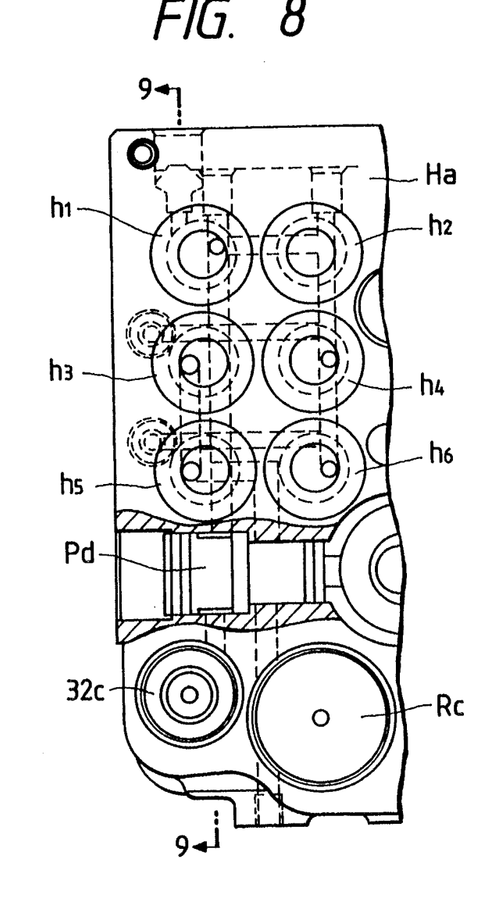
FIG. 8 is a partial view showing an arrangement of the mounting bores for circuit switching electromagnetic valves, pressure-increasing electromagnetic valves and pressure-reducing electromagnetic valves, according to the second modification.
Figure 9:
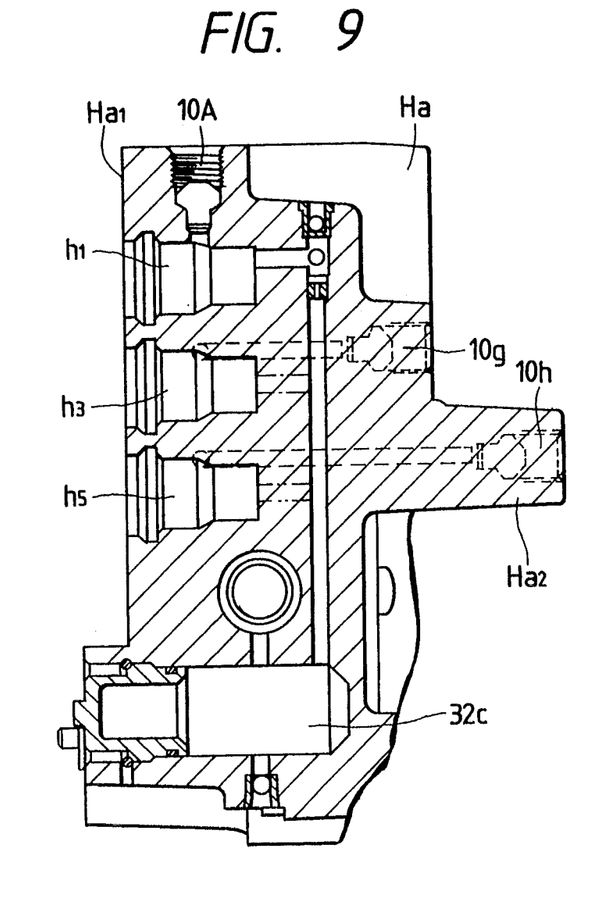
FIG. 9 is a sectional view taken along line 9—9 in FIG. 8.

Now, a second modification of the first preferred embodiment will be described hereinbelow with reference to FIGS. 7 to 9.

Figure 7:
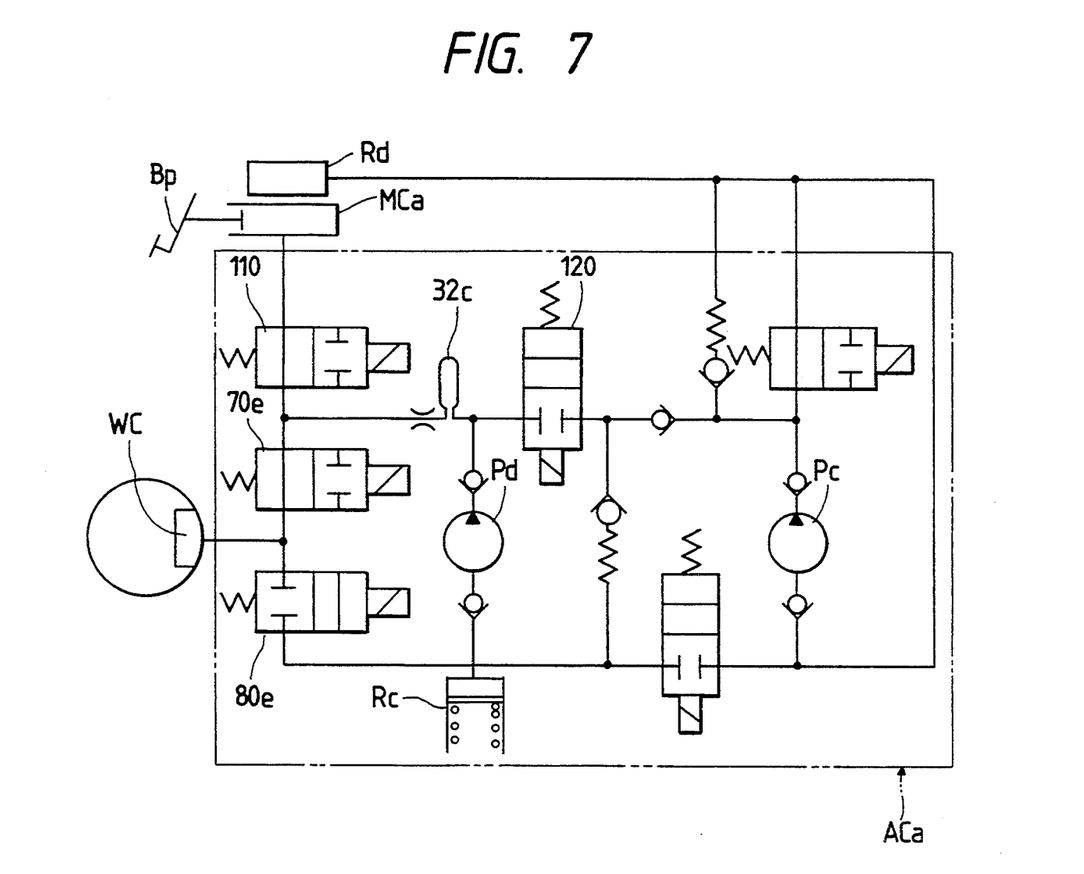
FIG. 7 is a hydraulic circuit diagram showing a second modification of the first preferred embodiment.

FIG. 7 shows a combined system of an anti-skid braking system and a traction control system for an automotive vehicle. In this combined system, an actuator ACa for the anti-skid braking control and the traction control is interposed between a master cylinder MCa and wheel cylinders WC of a pair of driving wheels. In this actuator ACa, an electromagnetic valve 110 is provided for closing a hydraulic circuit connected to the master cylinder MCa only when the traction control is executed. An electromagnetic valve 120 is further provided for opening a hydraulic circuit between a hydraulic source Pc and pressure-increasing electromagnetic valves 70e only when the traction control is executed. As shown in FIGS. 8 and 9, which respectively correspond to FIGS. 3 and 4, the electromagnetic valves 110 and 120 are respectively mounted in mounting bores h1 and h2 each formed in a housing Ha and each extending from a side of an end surface Ha1 of the housing Ha. The mounting bores h1 and h2 are arranged side by side in a line at an upper part (in FIGS. 8 and 9) of the housing Ha, and the electromagnetic valves 110 and 120 are respectively arranged in the mounting bores h1 and h2 concentrically therewith. On the other hand, the pressure-increasing electromagnetic valves 70e are respectively mounted in mounting bores h4 and h6 formed in the housing Ha at locations as shown in FIGS. 8 and 9 and extending from the side of the end surface Ha1. The pressure-increasing electromagnetic valves 70e are respectively arranged in the mounting bores h4 and h6 concentrically therewith. Pressure-reducing electromagnetic valves 80e are respectively mounted in mounting bores h3 and h5 formed in the housing Ha at locations as shown in FIGS. 8 and 9 and extending from the side of the end surface Ha1. The pressure-reducing electromagnetic valves 80e are respectively arranged in the mounting bores h4 and h6 concentrically therewith. By means of this structure, air bleed is ensured between the corresponding pressure-increasing and pressure-reducing valves 70e and 80e in the hydraulic circuit. As appreciated, each pressure-increasing valve 70e and each pressure-reducing valve 80e respectively correspond to the pressure-increasing valve and the pressure-reducing valve in the actuator AC in the first preferred embodiment.

On the other hand, the housing Ha is formed with an outlet port 10g connected to an inlet port of one of the two wheel cylinders WC, and with an outlet port 10h connected to an inlet port of the other of the two wheel cylinders WC. As shown in FIG. 9, the outlet port 10h is formed in a projected portion Ha2 of the housing Ha which protrudes a given distance from a position of the outlet port 10g. By means of this structure, a brake tube (not shown) can be easily mounted without using special tools. In FIGS. 7 to 9, a reference 10A represents an inlet port connected to an outlet port of the master cylinder MCa, 32c a damper, Pc and Pd piston pumps. Rc a hydraulic reservoir, and Rd an external hydraulic reservoir.

Figure 10:
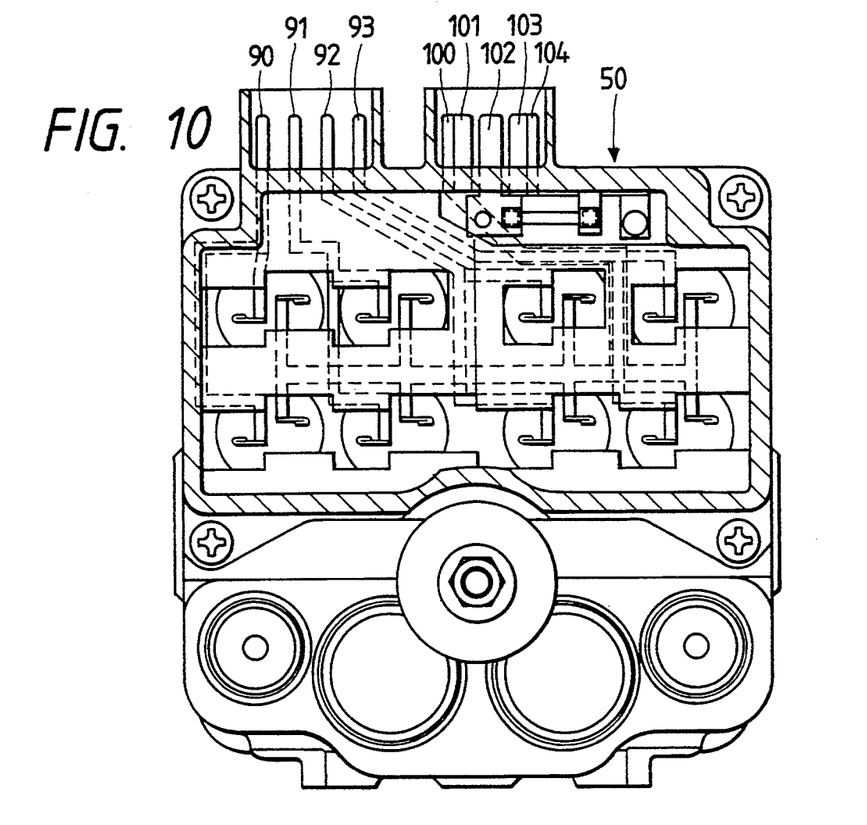
FIG. 10 is a partly sectional view showing a third modification of the first preferred embodiment.

Now, a third modification of the first preferred embodiment will be described hereinbelow with reference to FIG. 10.

In the first preferred embodiment, as shown in FIG. 2, the connector terminals 90 to 97 and 103 are embedded in the surrounding wall, i.e. the front, left-side, right-side and rear walls of the casing 50 with a given distance from each other so as to extend to reach the neighborhood of the solenoid terminals of the corresponding electromagnetic valves. On the other hand, in this third modification, as shown in FIG. 10, the connector terminals 90 to 97 and 103 are embedded not only in the surrounding wall of the casing 50, but also in the interior wall or the interior solid portion of the casing 50, which is continuous with the surrounding wall of the casing 50. After having passed through the interior wall of the casing 50 as being embedded therein, the connector terminals 90 to 97 and 103 reach the neighborhood of the solenoid terminals of the corresponding electromagnetic valves. By means of this structure, the connector terminals are easily embedded in the casing by the insert-molding with higher efficiency, i.e. with higher yield.

Figure 11:
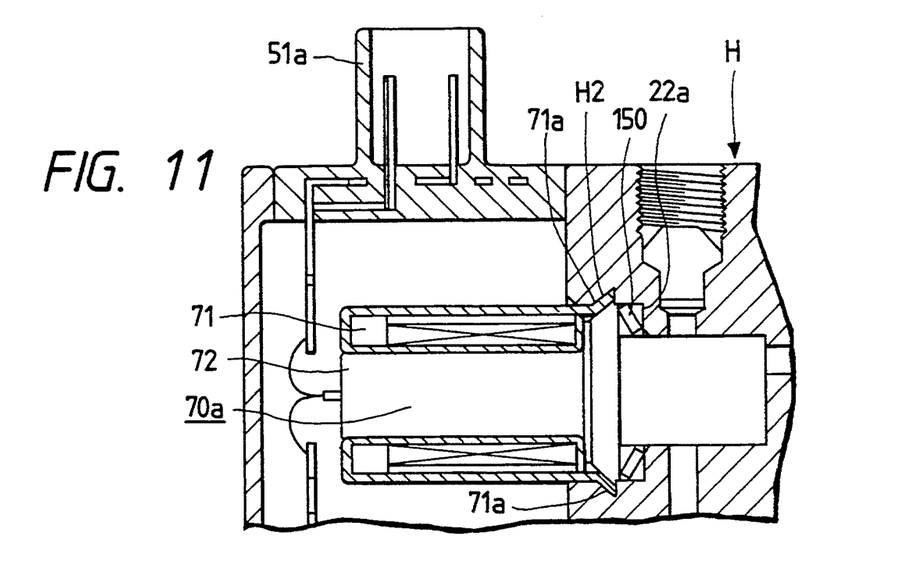
FIG. 11 is a partial sectional view showing a fourth modification of the first preferred embodiment.

Now, a fourth modification of the first preferred embodiment will be described hereinbelow with reference to FIG. 11.

In the fourth modification, an annular recess H2 is formed in the housing H near a bottom of the mounting bore 22a for the pressure-increasing electromagnetic valve 70a. As shown in FIG. 11, the solenoid unit 71 of the pressure-increasing valve 70a includes a valve mounting portion 71a which is fitted into the recess H2 so as to fixedly mount the pressure-increasing valve 70a to the housing H. On the other hand, the recess H2 has an assembling tolerance for receiving therein the valve mounting portion 71a. Accordingly, the pressure-increasing valve 70a is fixed to the housing H with a looseness corresponding to the assembling tolerance. In order to eliminate this looseness, a spring 150 is arranged at the bottom of the mounting bore 22a for constantly biasing the pressure-increasing valve 70a leftward in FIG. 11.

Although the explanation has been made with respect to the mounting structure of the pressure-increasing valve 70a only, the same structure as described above is also applied for mounting the pressure-increasing valves 70b to 70d and the pressure-reducing valves 80a to 80d in the third modification.

Accordingly, in the third modification, each of the electromagnetic valves 70a to 70d and 80a to 80d is constantly pressed against a left end of the recess H2 by means of the spring 150 so as to fix the solenoid unit thereof relative to the housing H and the casing 50. As a result, vibration proof or resistance is improved at the coupling portion between each connector terminal and each solenoid terminal.

In the foregoing first preferred embodiment, each of the projections t of the electromagnetic valves 70a to 70d and 80a to 80d is fitted into the corresponding one of the recesses 52a to 55a and 56a to 59a of the accommodating bores 52 to 55 and 56 to 59, so as to prevent rotation of the solenoid units of the electromagnetic valves. Instead of this, each accommodating bore may have an inward projection and each electromagnetic valve may have a corresponding recess on its outer periphery. By fitting each inward projection into the corresponding recess, each of the solenoid units of the electromagnetic valves is prevented from rotation.

Further, in the first preferred embodiment, each solenoid terminal formed by a coil is welded to the corresponding connecting portion of each connector terminal. Instead of this, a terminal of each solenoid unit of the electromagnetic valve may be coupled to the corresponding connecting portion of each connector terminal by soldering. In this case, each resistor r may also be connected by soldering.

Figure 12:
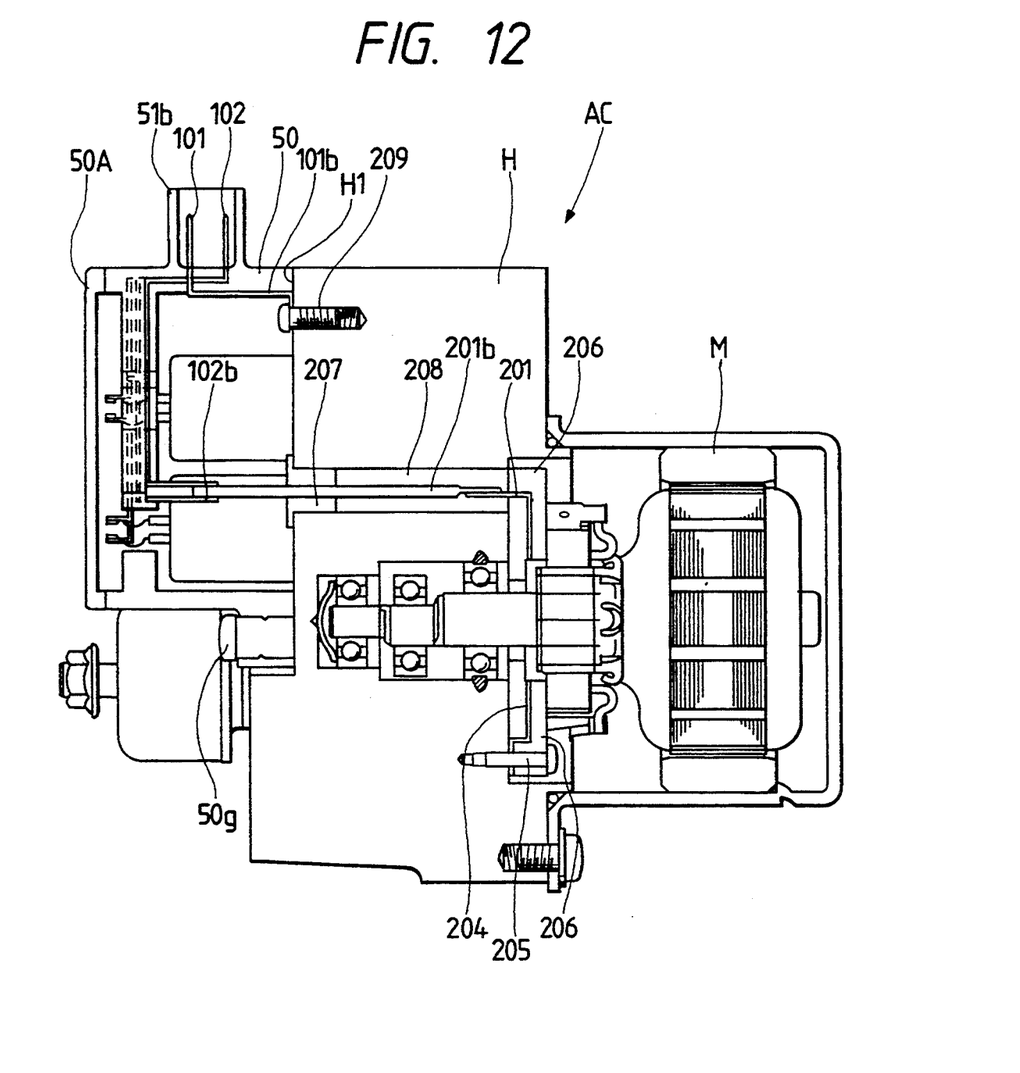
FIG. 12 is a partially fragmented view showing an actuator of an a braking system actuator according to a second preferred embodiment of the present invention.
Figure 13:
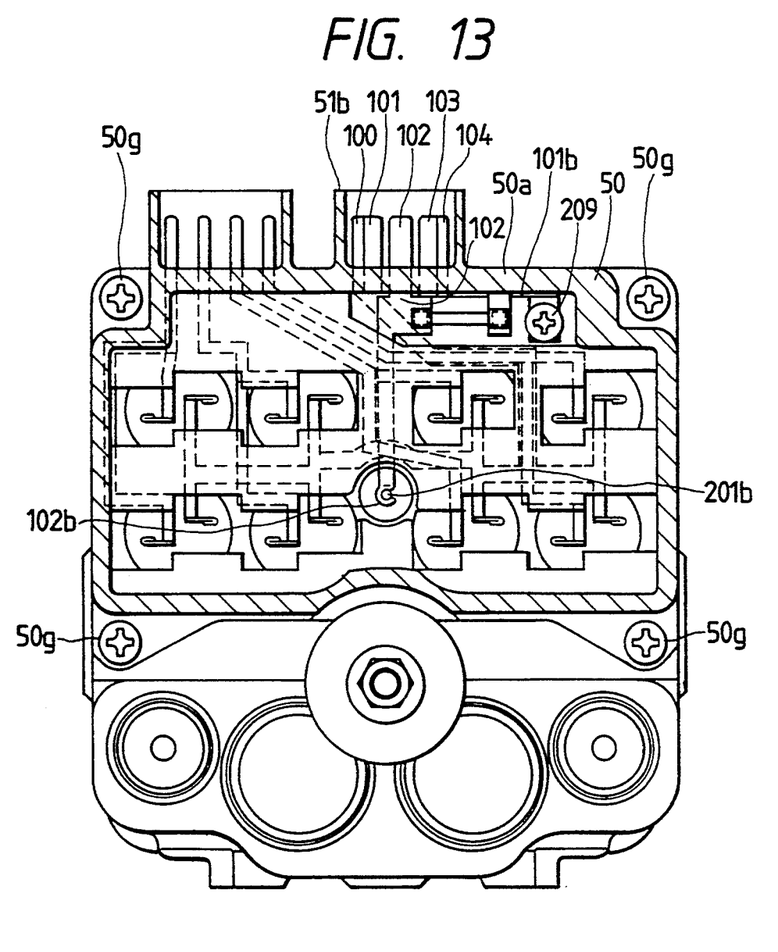
FIG. 13 is an enlarged view of the actuator as seen from an open side of a casing with a cap or a cover removed, according to the second preferred embodiment.

Now, a second preferred embodiment of the present invention will be described hereinbelow with reference to FIGS. 12 and 13.

A positive terminal 201 of the motor M which drives the piston pumps Pa and Pb is insulated from the housing H made of metal, such as, aluminum by means of an insulating member 206 made of a synthetic resin. A bore 208 is formed in the housing H. At an end of the bore 208, a bushing 207 is inserted from the side of the end surface H1 of the housing H. A terminal 201b is inserted through the bushing 207. Accordingly, the bushing 207 works to ensure insulation between the terminal 201b and the housing H, and further works to seal between the inside of the casing 50 and the inside of the motor M. The positive terminal 201 extends into the bore 208, and is welded to the terminal 201b therein. The terminal 201b extends into the casing 50 with a sufficient distance for insulation from the housing H.

On the other hand, the terminal 102 of the connector 51b which is connected to an external circuit extends through the surrounding wall, i.e. the front wall 50a of the casing 50 with its connecting end portion 102b in the casing 50. The connecting end portion 102b of the terminal 102 is connected to, i.e. fitted to the terminal 201b in the casing 50.

A negative terminal 204 of the motor M is fixed between the housing H and the insulating member 206 by a screw 205 so that the negative terminal 204 is short-circuited to the housing H. A connecting end portion 101b of the terminal 101 of the connector 51b is fixed to the housing H by a screw 209 so as to be short-circuited to the housing H. Accordingly, the negative terminal 204 of the motor M is electrically connected to the terminal 101 via the housing H made of metal, such as, aluminum. As described in the first preferred embodiment, the connector 51b also works as a connector for the electromagnetic valves.

In the second preferred embodiment, the connecting end portion 102b of the terminal 102 is easily connected to the terminal 201b when assembling the casing 50 to the housing H. Accordingly, the assembling of the actuator AC is improved.

In the second preferred embodiment, although the terminal 201 and the terminal 201b are described to be separate members, one integral terminal may be used therefor. Further, instead of using the screw 209, the connecting end portion 101b of the terminal 101 may be caulked to the housing H, or may be fixed to the housing H by means of the screw 50g when assembling the casing 50 to the housing H.

It is to be understood that this invention is not to be limited to the preferred embodiments and modifications described above, and that various changes and modifications may be made without departing from the spirit and scope of the invention as defined in the appended claims.

What is claimed is:

1. A braking system actuator comprising:
a casing made of an insulating material, said casing having at least one connector portion;
electromagnetic valves arranged in said casing, said electromagnetic valves each having a solenoid terminal;
electrically conductive terminals having an exterior connecting portion capable of being connected to an external circuit at said connector portion of said casing, said electrically conductive terminals being embedded in a surrounding wall of said casing at a given distance from each other, said electrically conductive terminals each having an interior connecting portion which extends from said surrounding wall of said casing so as to be in a neighborhood of a corresponding one of said solenoid terminals for connection with said corresponding one of said solenoid terminals; and
a resistor connected between an interior connecting portion of one of said electrically conductive terminals and an interior connection portion of another one of said electrically conductive terminals.

2. The braking system actuator as set forth in claim 1, wherein each of said interior connecting portions of said electrically conductive terminals in a first group of terminals is directly connected to said corresponding one of said solenoid terminals.

3. The braking system actuator as set forth in claim 1, wherein each of said solenoid terminals is formed by a coil.

4. A braking system actuator as set forth in claim 3, wherein each of said interior connecting portions of said electrically conductive terminals in a first group of terminals is directly welded to a corresponding one of said coils.

5. The braking system actuator as set forth in claim 1, wherein said casing includes fitting portions each being engageable with an outer periphery of a corresponding one of said electromagnetic valves so as to prevent rotation of said electromagnetic valves.

6. A braking system actuator as set forth in claim 1, wherein a cover is provided for closing an open side of said casing, said cover being welded to said open side of said casing after said interior connecting portions of said electrically conductive terminals in a first group of terminals are connected to said solenoid terminals of said electromagnetic valves.

7. The braking system actuator set forth in claim 6, wherein said cover is fixed to a housing by means of screws with said casing interposed therebetween, said housing including therein a hydraulic circuit.

8. The braking system actuator as set forth in claim 1, wherein said casing is fixed to a housing which includes therein a hydraulic circuit, and wherein said casing includes fitting means to be engaged with an outer periphery of said housing for strengthening a fixed relationship between said casing and said housing.

9. A braking system actuator comprising:
a casing made of an insulating material, said casing having at least one connector portion, and said casing including electromagnetic valves therein;
a housing including therein a hydraulic circuit which is opened or closed by said electromagnetic valves;
a motor which drives a pump for applying a hydraulic pressure to said hydraulic circuit, said motor having motor terminals at least one of which extends into said casing through said housing with a given distance for insulation from said housing; and
electrically conductive terminals having exterior connecting portions capable of being connected to an external circuit at said connector portion of said casing, said electrically conductive terminals embedded in a surrounding wall of said casing at a given distance from each other, said electrically conductive terminals each having an interior connecting portion which extends from said surrounding wall of the casing such that at least one of said interior connecting portions of said electrically conductive terminals is connected at all times to at least one of said motor terminals in said casing through a connecting terminal to provide an uninterrupted electrically conductive path from at least one of said exterior connecting portions to said at least one motor terminal.

10. A braking system actuator as set forth in claim 9, wherein one of said motor terminals is a negative terminal which is connected to said housing, and wherein one of said electrically conductive terminals to be connected to the external circuit is connected to said housing so as to correspond to said negative terminal of said motor.

* * * * *